(12) United States Patent
White, Jr.

(10) Patent No.: US 7,149,525 B2
(45) Date of Patent: Dec. 12, 2006

(54) SYSTEM FOR SELECTIVELY ANSWERING A TELEPHONE

(75) Inventor: Danny E. White, Jr., Kenosha, WI (US)

(73) Assignee: SBC Knowledge Ventures, L.P., Reno, NV (US)

( * ) Notice: Subject to any disclaimer, the term of this patent is extended or adjusted under 35 U.S.C. 154(b) by 0 days.

(21) Appl. No.: 11/434,406

(22) Filed: May 15, 2006

(65) Prior Publication Data

US 2006/0203974 A1    Sep. 14, 2006

Related U.S. Application Data

(63) Continuation of application No. 10/708,074, filed on Feb. 6, 2004, now Pat. No. 7,072,659.

(51) Int. Cl.
*H04Q 7/20* (2006.01)

(52) U.S. Cl. ............... 455/445; 455/462; 455/555; 455/554.2

(58) Field of Classification Search ............ 455/445, 455/462, 555, 554.2, 554.1, 426
See application file for complete search history.

(56) References Cited

U.S. PATENT DOCUMENTS

| | | | |
|---|---|---|---|
| 3,811,012 A | 5/1974 | Barber | |
| 4,760,593 A | 7/1988 | Shapiro et al. | |
| 5,559,860 A | 9/1996 | Mizikovsky | |
| 5,598,460 A | 1/1997 | Tendler | |
| 5,737,703 A | 4/1998 | Byrne | |
| 5,787,360 A | 7/1998 | Johnston et al. | |
| 6,240,181 B1 | 5/2001 | Tunstall | |
| 6,483,897 B1 | 11/2002 | Millrod | |
| 7,072,659 B1 * | 7/2006 | White, Jr. | ............ 455/445 |

* cited by examiner

*Primary Examiner*—Joseph Feild
*Assistant Examiner*—S. Smith
(74) *Attorney, Agent, or Firm*—Toler Schaffer, LLP

(57) ABSTRACT

A system to selectively answer a telephone is disclosed and includes a stationary unit connectable in line with a telephone line extending to the telephone. The stationary unit includes: a first antenna coupled to a first transmitter-receiver to communicate with a portable unit that includes a second antenna coupled to a second transmitter-receiver; a switching circuit to seize the telephone line after receiving a signal received from a first activatable switch of the portable unit, from a second activatable switch of the portable unit, or any combination thereof; and an autodialer circuit to dial a pre-programmed telephone number in response to a signal received from the second activatable switch of the portable unit. The stationary unit receives verbal communications from the portable unit and transmits the verbal communications via the telephone line after the telephone line is seized. At least one of the stationary unit and the portable unit includes a counter-timer circuit to restrictively permit activation of the autodialer circuit when the second activatable switch is activated a number of times within a time period.

20 Claims, 7 Drawing Sheets

SYSTEM FOR SELECTIVELY ANSWERING A TELEPHONE

REFERENCE TO RELATED APPLICATIONS

The present application is a continuation application of and claims priority to U.S. patent application Ser. No. 10/708,074 filed on Feb. 6, 2004 now U.S. Pat. No. 7,072,659, the contents of which are expressly incorporated herein by reference in their entirety.

TECHNICAL FIELD

The present disclosure generally relates to telephones that are connected to telephone lines and situated on the premises of telephone service subscribers. The present disclosure more particularly relates to calling and answering devices for use in conjunction with such telephones.

BACKGROUND

In a conventional telephone network, a telephone situated on the premises of a telephone service subscriber (i.e., customer) is generally connected to the end of a telephone line that extends from the central office (CO) of a local telephone service provider (i.e., telephone company). Within such a network, if an outside caller attempts to call the subscriber or some other person at the subscriber's premises, a ring generator situated within the central office transmits a pulsed ringing signal along the telephone line so that the signal is ultimately communicated to the telephone of the subscriber. Once the ringing signal is received and detected by the telephone, a ringer within the telephone then audibly sounds off in an intermittent fashion, both in sync with the pulsed ringing signal and in accordance to a predetermined ring cadence. During this time while the telephone is "ringing," the subscriber or some other person at the subscriber's premises, if present, has the option of taking the receiver of the telephone off-hook so that the telephone line is thereby seized and the subscriber or other person can converse with the caller over the line.

For a person who is elderly, infirm, disabled, handicapped, or not fully ambulatory, there are many times in which, though on the premises and within earshot of the telephone, he is not able to reach the telephone in time (i.e., while it is still ringing and before the caller hangs up) to answer. When a telephone call is missed in this manner, the person must either resign himself to having missed the call altogether or rely on a phone answering machine, a phone answering service, a caller ID (identification) service, or a last call return service so that he may, if he so desires, call the caller back. In a few instances, missing calls may actually be desirable if the calls are unwanted, such as, for example, unsolicited calls from telemarketers. Missing calls, however, from more favored, preferred, or important callers is highly undesirable, for the person in each instance is either relegated to having missed the call altogether or must go through the hassle and inconvenience of having to call the caller back.

To avoid missing important telephone calls while on-premises, a person who is elderly, infirm, disabled, handicapped, or not fully ambulatory may perhaps decide to tote around the unattached handset portion of a cordless telephone set. Doing so on a long-term basis, however, is generally neither feasible nor practical for many such persons, for the handset portions of cordless telephone sets are typically too bulky and cumbersome to be carried around continuously. As an alternative, such a person may instead perhaps choose to carry around a cellular telephone, for cellular telephones are typically both compact in size and lightweight and are therefore generally less cumbersome. Toting such a cellular telephone while on-premises, too, however, is generally neither feasible nor practical for many such persons, for cellular telephones often have poor reception when utilized indoors, have diminutive buttons and features requiring good manual dexterity and vision to operate, and are somewhat functionally complex.

In light of the above, there is a present need in the art for a telephone answering device or system that (1) enables a person to selectively answer a telephone from a remote location, (2) is lightweight and easy to carry around for a long period of time, (3) is easy to operate manually, and (4) is functionally simple.

BRIEF DESCRIPTION OF THE DRAWINGS

Hereinbelow, the present disclosure is described in detail, by way of example, with reference to drawings included in FIGS. 1 through 6. In all FIGS. 1 through 6, the same or similar reference numerals are generally used to identify the same or similar drawing features. A brief description of the pictorial content included within each of FIGS. 1 through 6 is set forth as follows.

DETAILED DESCRIPTION

A system to selectively answer a telephone from a remote location is disclosed and includes a stationary unit connectable in line with a telephone line extending to the telephone, where the stationary unit includes: a first antenna coupled to a first transmitter-receiver to communicate with a portable unit that includes a second antenna coupled to a second transmitter-receiver; a switching circuit to seize the telephone line after receiving a signal received from a first activatable switch of the portable unit, from a second activatable switch of the portable unit, or any combination thereof; and an autodialer circuit to dial a pre-programmed telephone number in response to a signal received from the second activatable switch of the portable unit. The stationary unit receives verbal communications from the portable unit and transmits the verbal communications via the telephone line after the telephone line is seized. At least one of the stationary unit and the portable unit includes a counter-timer circuit to restrictively permit activation of the autodialer circuit when the second activatable switch is activated a number of times within a time period.

In another embodiment, a system to selectively answer a telephone from a remote location is disclosed and includes a portable unit that includes: a first antenna coupled to a first transmitter-receiver to communicate with a stationary unit; a first activatable switch to selectively trigger the stationary unit to seize a telephone line in response to a ringing signal received over the telephone line; a second activatable switch to selectively trigger the stationary unit to seize the telephone line and to dial a pre-programmed telephone number; and a microphone to transmit verbal communications to the stationary unit, such that the stationary unit is enabled to transmit the verbal communications via the telephone line after the telephone line is seized. At least one of the stationary unit and the portable unit includes a counter-timer circuit to restrictively permit activation of the autodialer circuit when the second activatable switch is activated a number of times within a time period.

Figure 1:
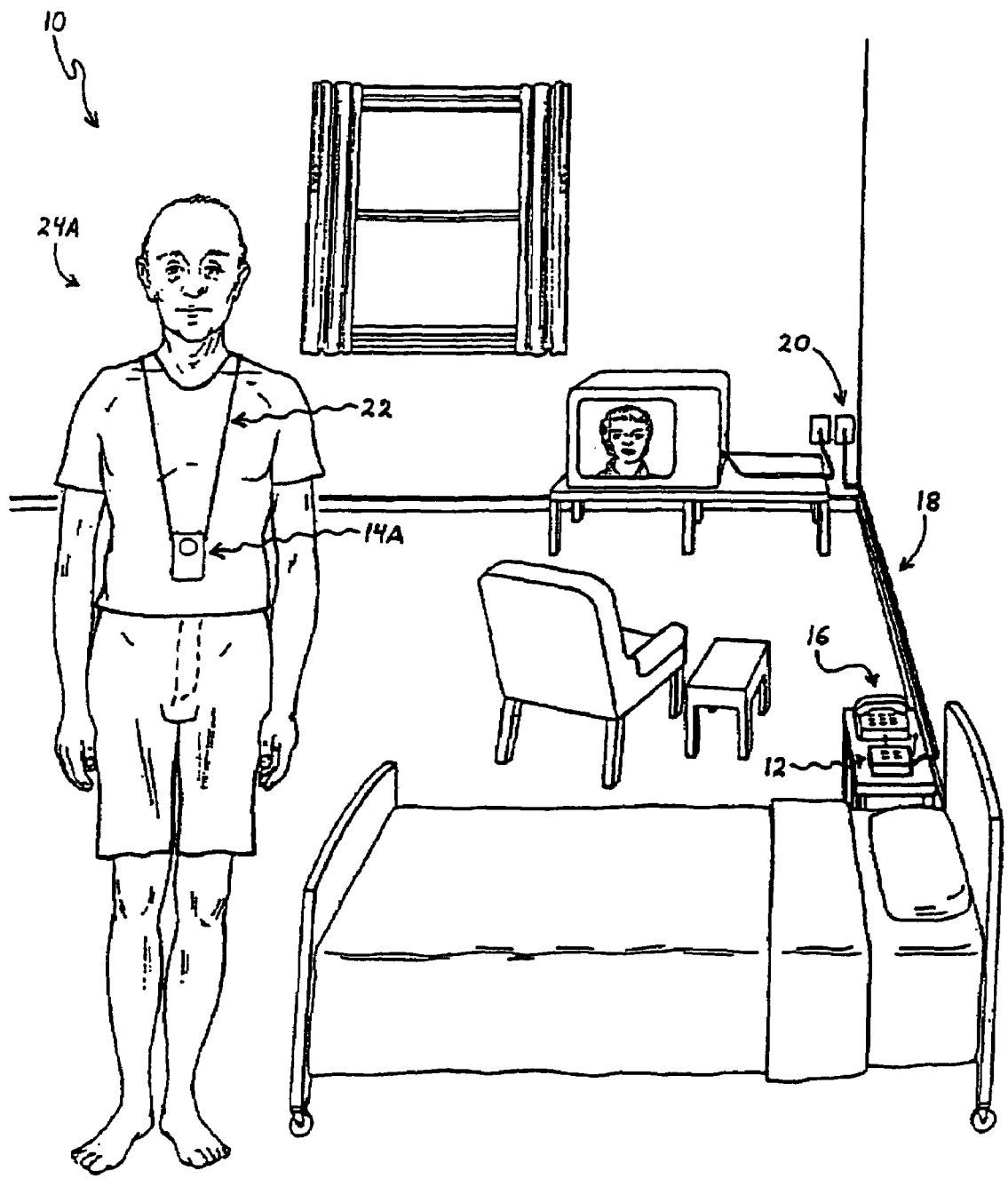
FIG. 1 is an illustration of a system for selectively answering a telephone from a remote location, wherein the system is shown to include both a stationary unit and a portable unit.

FIG. 1 is an illustration of a system 10 for selectively answering a conventional telephone 16 from a remote location. As illustrated, the system 10 itself basically includes both a stationary unit 12 and a portable unit 14A. During operation, the stationary unit 12 and the portable unit 14A are in electromagnetic communication with each other.

As illustrated in FIG. 1, the stationary unit 12, first of all, is generally connectable in line with a telephone line 18 that extends to the telephone 16. In a preferred embodiment, the stationary unit 12 is particularly adapted and structured for being connected in line with a conventional base cord, line cord, or mounting cord that extends, for example, between a conventional wall-mounted phone jack 20 and the telephone 16. The portable unit 14A, in turn, is generally totable or wearable on-person. In the embodiment shown in FIG. 1, the portable unit 14A particularly includes an attached string 22 that is loosely draped around the neck of a person 24A so that the portable unit 14A may be effortlessly carried on-person for easy-access operation.

Figure 2A:
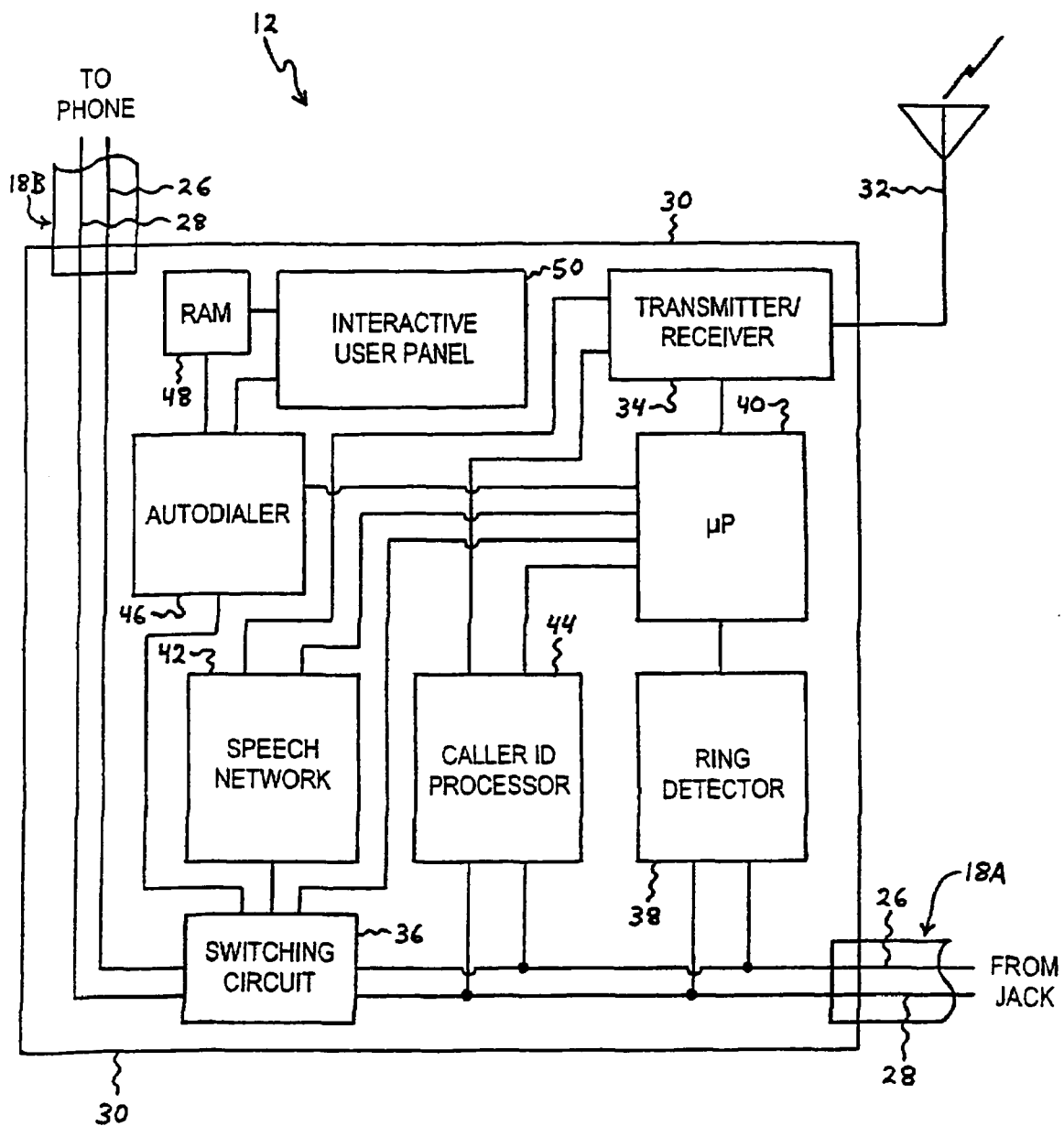
FIG. 2A is a block diagram of the stationary unit depicted in FIG. 1, wherein the many various components included within the stationary unit are highlighted.

FIG. 2A is a block diagram of the stationary unit 12 depicted in FIG. 1. As shown in FIG. 2A, the stationary unit 12 generally includes many various features and components. More particularly, the stationary unit 12 includes a ring detector circuit 38, a caller ID processor 44, an antenna 32, a transmitter-receiver 34, a switching circuit 36, a microprocessor (.mu.P) 40, a speech network 42, an autodialer circuit 46, a random access memory (RAM) 48, an interactive user panel 50, and an enclosure 30.

The ring detector circuit 38, first of all, is mounted and housed within the enclosure 30 of the stationary unit 12. As shown in FIG. 2A, the ring detector circuit 38 is electrically connected to both the tip wire 26 and the ring wire 28 of the telephone line 18A. Connected as such, the ring detector circuit 38 generally serves to "awake" and activate the overall system 10 upon detecting the pulses of a ringing signal received over the telephone line 18A from the central office (CO) of a local telephone service provider (i.e., telephone company). If the system 10 is utilized, for example, in conjunction with a conventional North American telephone network, the ring detector circuit 38 should be adapted to detect a ringing signal having both a voltage within a range of about 70 to 90 V.sub.AC (alternating-current volts) and a frequency within a range of about 17 to 20 Hz (hertz).

The caller ID processor 44, next of all, is mounted and housed within the enclosure 30 of the stationary unit 12. As shown in FIG. 2A, the caller ID processor 44 is also electrically connected to both the tip wire 26 and the ring wire 28 of the telephone line 18A. Connected as such, the caller ID processor 44 generally serves as a circuit for processing caller ID data signals received over the telephone line 18A. In a conventional North American telephone network, for example, such caller ID data signals are typically communicated between the first and second pulses of a received ringing signal. Furthermore, caller identification information actually conveyed via these caller ID data signals frequently includes, for example, the date of call, the time of call, the telephone number associated with the call-originating telephone, and the identification of the subscriber who purchased telephone service for the call-originating telephone.

The antenna 32 and the transmitter-receiver 34, in turn, are generally mounted and housed within, or supported on, the enclosure 30 of the stationary unit 12. As shown in FIG. 2A, the antenna 32 and the transmitter-receiver 34 are generally directly connected together. Connected as such, electromagnetic signals can therefore be sent and received by the antenna 32 of the stationary unit 12 for the purpose of establishing a communication link with the portable unit 14A. In this way, information or data signals as well as control signals can therefore be passed between the stationary unit 12 and the portable unit 14A. For the purpose of ensuring that the stationary unit 12 is relatively compact in size so that it does not have a large "footprint" and unnecessarily take up surface space, the transmitter-receiver 34 may in some embodiments be a transceiver.

The switching circuit 36, next of all, is mounted and housed within the enclosure 30 of the stationary unit 12. As shown in FIG. 2A, the switching circuit 36 is electrically connected in line with both the tip wire 26 and the ring wire 28 of the telephone line 18. Connected as such, the switching circuit 36 serves to "seize" the telephone line 18 by creating an off-hook condition in the telephone line 18 that is recognizable, for example, by the central office of the local telephone company. To create such an off-hook condition in the telephone line 18, the switching circuit 36 generally includes one or more switching devices such as, for example, relays.

The microprocessor (.mu.P) 40, in turn, is mounted and housed within the enclosure 30 of the stationary unit 12. As shown in FIG. 2A, the microprocessor 40 is electrically connected to many, if not most, of the primary electronic components that make up the stationary unit 12. Connected as such, the microprocessor 40 serves to process both control signals and data signals in order to thereby largely coordinate and control the overall operation of the stationary unit 12. Though the microprocessor 40 as depicted in FIG. 2A is shown to be singular, it is to be understood that the microprocessor 40 itself may very well include one or more microprocessors, microcontrollers, and/or memory chips pursuant to the present invention.

The speech network 42, next of all, is mounted and housed within the enclosure 30 of the stationary unit 12. As shown in FIG. 2A, the speech network 42 is electrically interconnected between the switching circuit 36 and the transmitter-receiver 34 associated with the antenna 32. Connected as such, the speech network 42 thus serves to process speech and voice signals for the purpose of facilitating both the transmission and receipt of such signals over the telephone line 18 as well as the communication of such signals through the stationary unit 12. In addition, the speech network 42 also serves to facilitate functional cooperation between the stationary unit 12 and the portable unit 14 so that full duplex operation of the overall system 10 is made possible. In this way, a person 24 can simultaneously talk and listen over the portable unit 14 without experiencing intermittent interruptions.

The autodialer circuit 46, the random access memory (RAM) 48, and the interactive user panel 50, in turn, are generally mounted and housed within, or supported on, the enclosure 30 of the stationary unit 12. As shown in FIG. 2A, the autodialer circuit 46, the random access memory 48, and the interactive user panel 50 are generally electrically connected together. The autodialer circuit 46, in addition, is also electrically connected to both the microprocessor 40 and the switching circuit 36. In such a configuration, the autodialer circuit 46 serves to automatically speed dial a pre-programmed emergency response telephone number whenever activated. Such an emergency response telephone number may, for example, be the telephone number for a local "911" dispatch unit, the local police department, the local fire department, a local hospital or ambulance service, a home security service, an on-call medical assistance service, an assisted living service, or the like. The interactive user panel 50 can be used by a person 24 to selectively program and even reprogram the autodialer circuit 46 so that a particularly preferred emergency response telephone number is automatically speed dialed by the circuit 46 when activated. Whenever the autodialer circuit 46 is selectively programmed in this manner, the selected telephone number itself is stored in the random access memory 48 for lookup access.

The enclosure 30, last of all, is structurally adapted for housing, mounting, or supporting each of the aforementioned features and components associated with the stationary unit 12. Although other constituent materials may indeed be utilized, the enclosure 30 is preferably made of plastic.

Figure 2B:
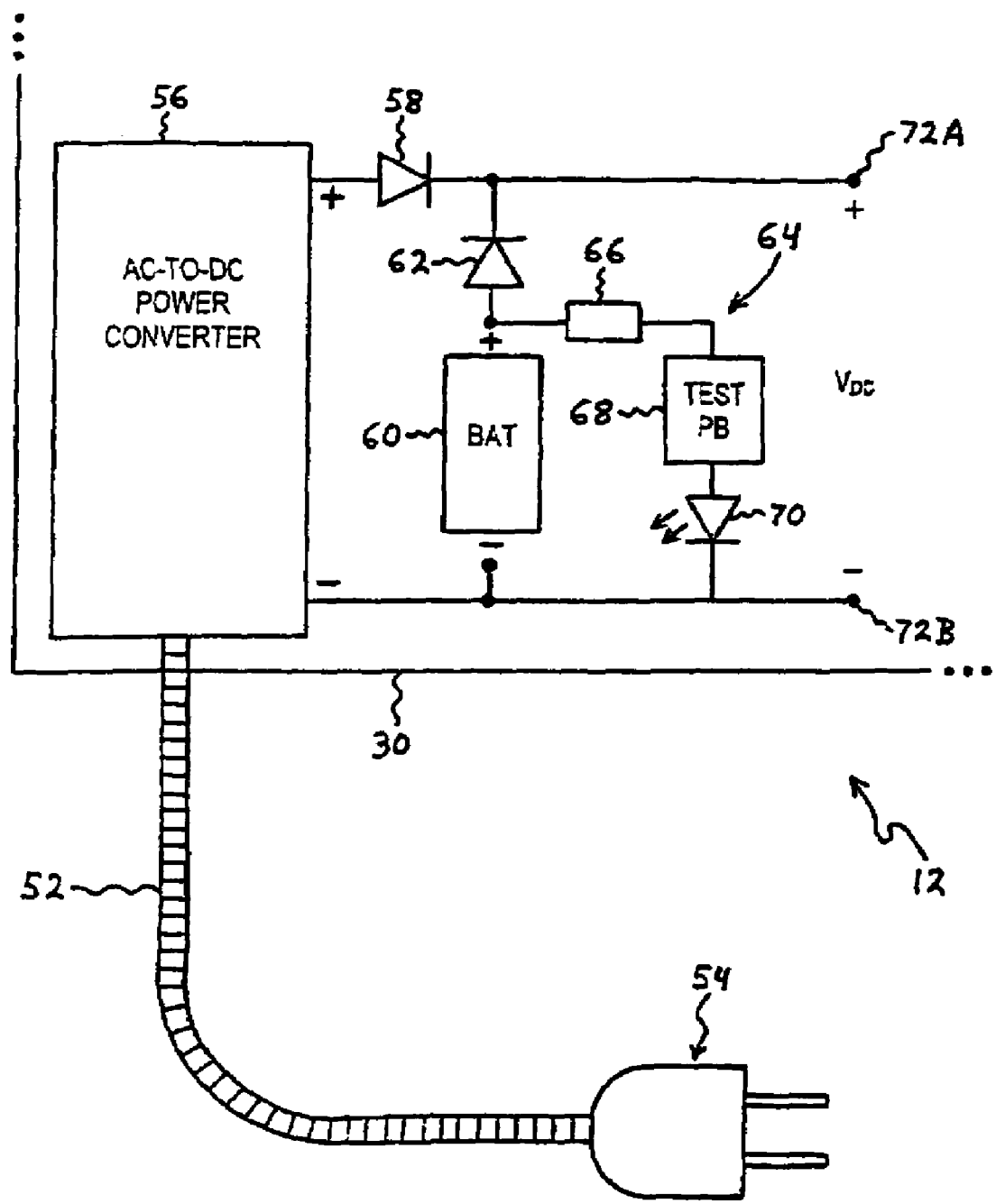
FIG. 2B is a supplemental block diagram of the stationary unit depicted in FIG. 2A, wherein the stationary unit is shown to also include an extendable power cord with pronged plug and a backup battery.

FIG. 2B is a supplemental block diagram of the stationary unit 12 depicted in FIG. 2A. As shown in FIG. 2B, the stationary unit 12 also includes a power cord 52, a pronged plug 54, an AC-to-DC (alternating current to direct current) power converter 56, structure for retaining a replaceable battery (BAT) 60, and a battery test circuit 64.

The power cord 52, first of all, is extendable from the enclosure 30 of the stationary unit 12, and the pronged plug 54 is affixed to the extendable end of the cord 52. Together, the power cord 52 and the pronged plug 54 serve as a means for drawing electrical power from a conventional alternating-current (AC) power outlet.

The AC-to-DC power converter 56, next of all, is mounted and housed within the enclosure 30 of the stationary unit 12. As shown in FIG. 2B, the power converter 56 is electrically connected to the other end of the power cord 52. Connected as such, the power converter 56 essentially serves to supply electrical power, in the form of a regulated direct-current (DC) voltage ($V_{DC}$), to the various electronic components within the stationary unit 12. Such electrical-power is particularly made available to the various electronic components via a positive power node 72A and a negative power node 72B. To ensure that the power converter 56 is not inadvertently reverse biased during operation of the system 10, a diode 58 is electrically connected between the positive output of the power converter 56 and the positive power node 72A as shown in FIG. 2B. the structure for retaining a replaceable battery (BAT) 60, in turn, is housed within the enclosure 30 of the stationary unit 12. In general, having structure for retaining such a battery 60 enables the stationary unit 12 to alternatively draw electrical power from the battery 60 should electrical power being drawn from an AC power outlet via the power cord 52 ever suddenly be cut off. In this way, the battery 60 serves as a backup power supply for the stationary unit 12.

The battery test circuit 64, next of all, is generally mounted and housed within the enclosure 30 of the stationary unit 12. In general, the test circuit 64 serves as a means for determining whether the battery 60 needs to be replaced. To make such a determination, the test circuit 64 includes a resistor 66, a battery test push-button 68 (normally open), and a light-emitting diode (LED) 70 all connected in series between the positive and negative terminals of the battery 60 as shown in FIG. 2B. Furthermore, to ensure that the battery 60 is not inadvertently reverse biased during operation of the system 10, a diode 62 is electrically connected between the positive terminal of the battery 60 and the positive power node 72A as also shown in FIG. 2B. Connected as such, a person 24 can press the test push-button 68 and thereby complete an electrically conductive path between the two terminals of the battery 60 via the test circuit 64. If the battery 60 still retains an electrical charge between its terminals, electric current will flow through the test circuit 64, thereby illuminating the light-emitting diode 70. Upon seeing the light-emitting diode 70 visibly illuminated, the person 24 may then conclude that the battery 60 still retains an electrical charge (i.e., is not "dead") and therefore does not yet need to be replaced. If, on the other hand, the battery 60 no longer retains an electrical charge, no electric current will flow through the test circuit 64. As a result, the light-emitting diode 70 will not be illuminated. Upon seeing that the light-emitting diode 70 is not illuminated, the person 24 may then conclude that the battery 60 no longer retains an electrical charge (i.e., is dead) and that the battery 60 should therefore be replaced. In this way, the battery test circuit 64 particularly serves as a visible indicator as to whether the battery 60 still retains an electrical charge between its terminals.

Figure 3A:
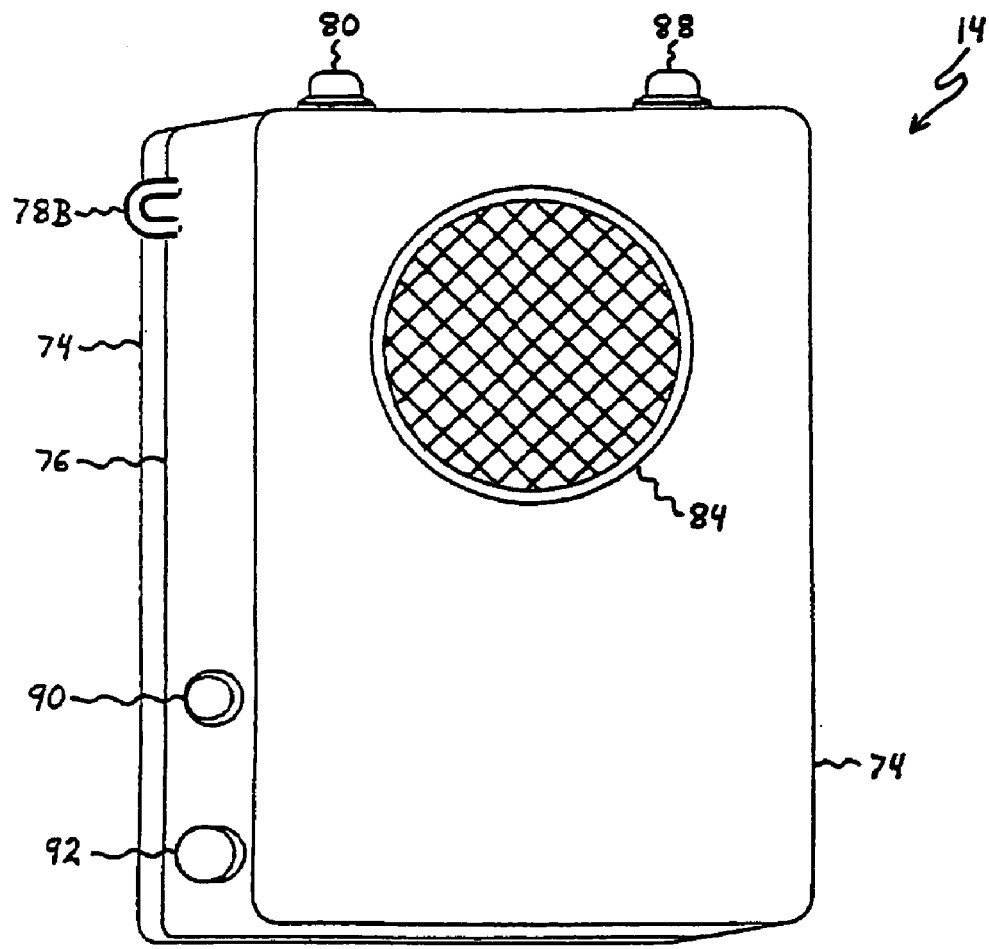
FIG. 3A is a front perspective view of the portable unit in FIG. 1.

FIG. 3A is a front perspective view of the portable unit 14A in FIG. 1. As shown in FIG. 3A, the portable unit 14 generally has many various external features or components. More particularly, these external features or components include a casing 74, two ringlets 78A (see FIG. 3B) and 78B, an answer (ANS) push-button 80, an emergency (or "911") push-button 88, a speaker 84, a light-emitting diode (LED) 90, and a battery test push-button 92.

The casing 74, first of all, is structurally adapted for housing, mounting, or supporting the many various features or components associated with the portable unit 14. As shown in FIG. 3A, the casing 74 may be separated into two sections along a crack 76. In this way, the portable unit 14 can be internally serviced as needed. Furthermore, although other constituent materials may indeed be utilized, the casing 74 is preferably made of lightweight plastic.

The two ringlets 78A and 78B, next of all, are fixed onto or integral with the outer surface of the casing 74. As shown in FIG. 3A, the ringlets 78A and 78B are particularly situated at or near the top of the casing 74. Situated as such, the two ringlets 78A and 78B ideally serve as convenient means for attaching or tying the two ends of a string to the portable unit 14. In this way, the portable unit 14 can easily be worn on-person as illustrated, for example, in FIG. 1.

The answer (ANS) push-button 80, in turn, is mounted on the top of the casing 74 of the portable unit 14. In general, the answer push-button 80 serves as an activatable switch for selectively triggering seizure of the telephone line 18 via the switching circuit 36 in response to any ringing signal that is detected by the ring detector circuit 38. In this way, the answer push-button 80 enables a remotely situated person 24 to take the telephone line 18 off-hook in order to answer the telephone 16 before an outside caller hangs up.

The emergency (or "911") push-button 88, next of all, is mounted on the top of the casing 74 of the portable unit 14. In general, the emergency push-button 88 serves as an activatable switch for selectively triggering both seizure of the telephone line 18 and activation of the autodialer circuit 46. In this way, the emergency push-button 88 enables a remotely situated person 24 to take the telephone line 18 off-hook and automatically speed dial an emergency response telephone number in the event of a perceived emergency.

The speaker (SPKR) 84, in turn, is mounted within the front panel of the casing 74 of the portable unit 14. In general, the speaker 84 serves as a means for receiving audible communications over the telephone line 18 whenever the telephone line is seized by the switching circuit 36. In this way, the speaker 84 enables a remotely situated person 24 to hear the voice of a caller or an emergency response worker communicated over the telephone line 18.

The light-emitting diode (LED) 90 and the battery test push-button 92, last of all, are proximately mounted together on a side of the casing 74 of the portable unit 14 near the crack 76. Together, the light-emitting diode 90 and the test push-button 92 cooperatively serve as means for helping determine whether a power-supplying battery 94 (see FIG. 4) housed within the casing 74 needs to be replaced. In particular, if a person 24 presses the test push-button 92 and the light-emitting diode 90 is thereby illuminated, the person 24 may then conclude that the battery 94 still retains an electrical charge and therefore does not yet need to be replaced. If, on the other hand, the light-emitting diode 90 is not thereby illuminated, the person 24 may then conclude that the battery 94 no longer retains an electrical charge and should therefore be replaced.

Figure 3B:
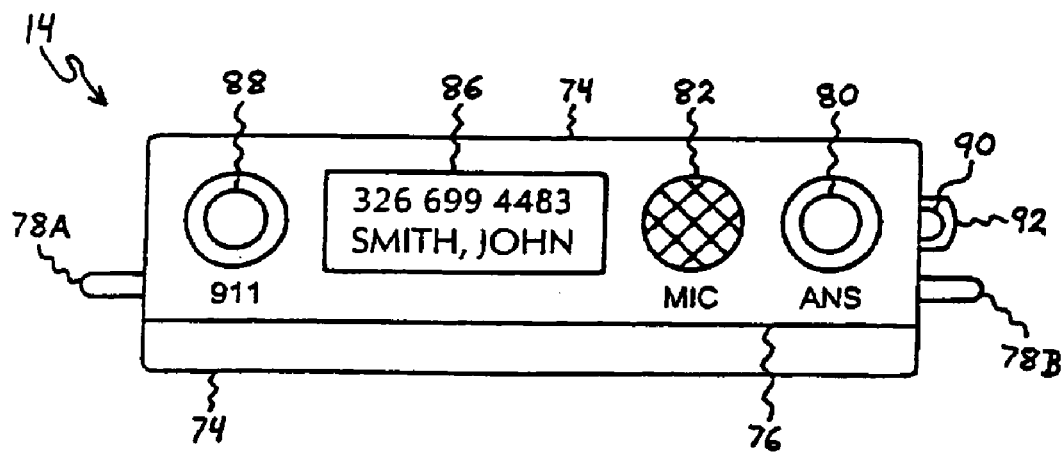
FIG. 3B is a top view of the portable unit in FIG. 3A.

FIG. 3B is a top view of the portable unit 14 in FIG. 3A. As shown in FIG. 3B, the portable unit 14 also includes additional external features or components. More particularly, these additional external features or components include a microphone (MIC) 82 and a caller ID display 86.

The microphone (MIC) 82, first of all, is mounted on the top of the casing 74 of the portable unit 14. Mounted as such, the microphone 82 serves as a means for transmitting verbal communications over the telephone line 18 whenever the telephone line 18 is seized by the switching circuit 36. In this way, the microphone 82 enables a remotely situated person 24 to speak to a caller or an emergency response worker over the telephone line 18.

The caller ID display 86, in turn, is mounted on the top of the casing 74 of the portable unit 14. Mounted as such, the caller ID display 86 serves as a viewable display for visually presenting caller identification information generated from the caller ID data signals processed by the caller ID processor 44. In this way, when the ring detector circuit 38 detects a ringing signal, the caller ID display 86 enables a remotely situated person 24 to view the display 86 in order to determine the identity of the caller. Upon learning the identity of the caller, the person 24 may then exercise discretion in deciding whether to press the answer push-button 80 in order to seize the telephone line 18 and converse with the caller. Furthermore, in a preferred embodiment, the caller ID display 86 itself is a liquid-crystal display (LCD).

Figure 4:
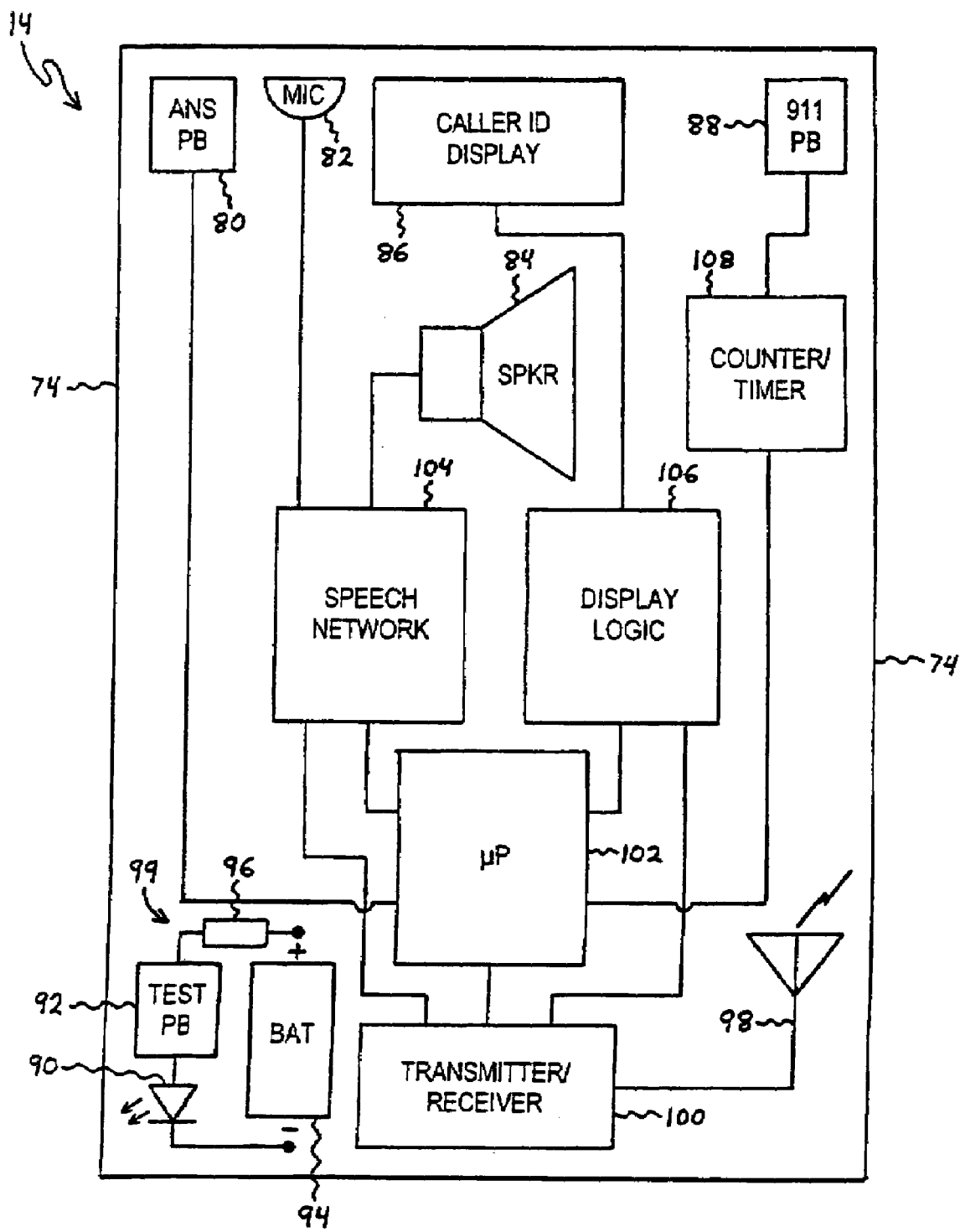
FIG. 4 is a block diagram of the portable unit depicted in FIGS. 3A and 3B, wherein the many various components included within the portable unit are highlighted.

FIG. 4 is a block diagram of the portable unit 14 depicted in FIGS. 3A and 3B. As shown in FIG. 4, the portable unit 14 additionally includes various internal features and components that generally cannot be viewed when the casing 74 is fully assembled. Some of these features and components include, in particular, structure for retaining the aforementioned replaceable battery (BAT) 94, a battery test circuit 99, an antenna 98, a transmitter-receiver 100, a microprocessor (.mu.P) 102, a speech network 104, display logic 106, and a counter-timer circuit 108.

The structure for retaining the replaceable battery (BAT) 94, first of all, is housed within the casing 74 of the portable unit 14. In general, having structure for retaining such a replaceable battery 94 enables the portable unit 14 to draw electrical power from a self-contained and portable power source, that is, the battery 94 itself. As a result, the portable unit 14 can be operated as a cordless device.

The battery test circuit 99, next of all, is generally mounted and housed within the casing 74 of the portable unit 14. In general, the test circuit 99 serves as a means for determining whether the battery 94 needs to be replaced. To make such a determination, the test circuit 99 includes a resistor 96, the aforementioned battery test push-button 92 (normally open), and the aforementioned light-emitting diode (LED) 90 all connected in series-between the positive and negative terminals of the battery 94 as shown in FIG. 4. Connected as such, a person 24 can press the test push-button 92 and thereby complete an electrically conductive path between the two terminals of the battery 94 via the test circuit 99. If the battery 94 still retains an electrical charge between its terminals, electric current will flow through the test circuit 99, thereby illuminating the light-emitting diode 90. Upon seeing the light-emitting diode 90 visibly illuminated, the person 24 may then conclude that the battery 94 still retains an electrical charge and therefore does not yet need to be replaced. If, on the other hand, the battery 94 no longer retains an electrical charge, no electric current will flow through the test circuit 99. As a result, the light-emitting diode 90 will not be illuminated. Upon seeing that the light-emitting diode 90 is not illuminated, the person 24 may then conclude that the battery 94 no longer retains an electrical charge and that the battery 94 should therefore be replaced. In this way, the battery test circuit 99 particularly serves as a visible indicator as to whether the battery 94 still retains an electrical charge between its terminals.

The antenna 98 and the transmitter-receiver 100, in turn, are generally mounted and housed within, or supported on, the casing 74 of the portable unit 14. As shown in FIG. 4, the antenna 98 and the transmitter-receiver 100 are generally directly connected together. Connected as such, electromagnetic signals can therefore be sent and received by the antenna 98 of the portable unit 14 for the purpose of establishing a communication link with the stationary unit 12. Such electromagnetic signals may particularly include, for example, electromagnetic waves having frequencies encompassed within the radio frequency spectrum. Ultimately, in establishing such a communication link, information or data signals as well as control signals can therefore be passed between the portable unit 14 and the stationary unit 12. For the purpose of ensuring that the portable unit 14 is relatively compact in size so that it is not bulky and unnecessarily cumbersome to carry, the transmitter-receiver 100 may in some embodiments be a transceiver.

The microprocessor (.mu.P) 102, next of all, is mounted and housed within the casing 74 of the portable unit 14. As shown in FIG. 4, the microprocessor 102 is electrically connected to many, if not most, of the primary electronic components that make up the portable unit 14. Connected as such, the microprocessor 102 serves to process both control signals and data signals in order to thereby largely coordinate and control the overall operation of the portable unit 14. Though the microprocessor 102 as depicted in FIG. 4 is shown to be singular, it is to be understood that the microprocessor 102 itself may very well include one or more microprocessors, microcontrollers, and/or memory chips pursuant to the present invention.

The speech network 104, in turn, is mounted and housed within the casing 74 of the portable unit 14. As shown in FIG. 4, the speech network 104 is electrically interconnected between the microphone 82, the speaker 84, the microprocessor 102, and the transmitter-receiver 100 associated with the antenna 98. Connected as such, the speech network 104 thus serves to process speech and voice signals for the purpose of facilitating both the transmission and receipt of such signals over the telephone line 18 as well as the communication of such signals through the portable unit 14. In addition, the speech network 104 also serves to facilitate functional cooperation between the portable unit 14 and the stationary unit 12 so that full duplex operation of the overall system 10 is made possible. In this way, a person 24 can simultaneously talk and listen over the portable unit 14 without experiencing intermittent interruptions.

The display logic 106, next of all, is mounted and housed within the casing 74 of the portable unit 14. As shown in FIG. 4, the display logic 106 is electrically interconnected between the caller ID display 86, the microprocessor 102, and the transmitter-receiver 100 associated with the antenna 98. Connected as such, the display logic 106 serves to further process the caller ID data signals as received and previously processed by the caller ID processor 44 in the stationary unit 12. In this way, the display logic 106 works to ensure that caller identification information, as generated from the processed caller ID data signals, is ultimately displayed on the caller ID display 86 in a readable format.

The counter-timer circuit 108, in turn, is mounted and housed within the casing 74 of the portable unit 14. As shown in FIG. 4, the counter-timer circuit 108 is electrically connected between the emergency (or "911") push-button 88 and the microprocessor 102. Connected as such, the counter-timer circuit 108 serves to restrictively permit activation of the autodialer circuit 46 to only when the emergency push-button 88 is activated (i.e., pressed) a predetermined number of times within a predetermined period of time. For example, the counter-timer circuit 108 may be designed and/or programmed to only permit activation of the autodialer circuit 46 when the emergency push-button 88 has been pressed three or more times within a ten-second time period (i.e., 3.times. within 10 secs). In this way, the autodialer circuit 46 is not activated to dial an emergency response telephone number when the emergency push-button 88 is merely inadvertently bumped or mistakenly pressed by a person 24. As a result, false-alarm phone calls are thereby largely prevented.

Figures 5A, 5B:
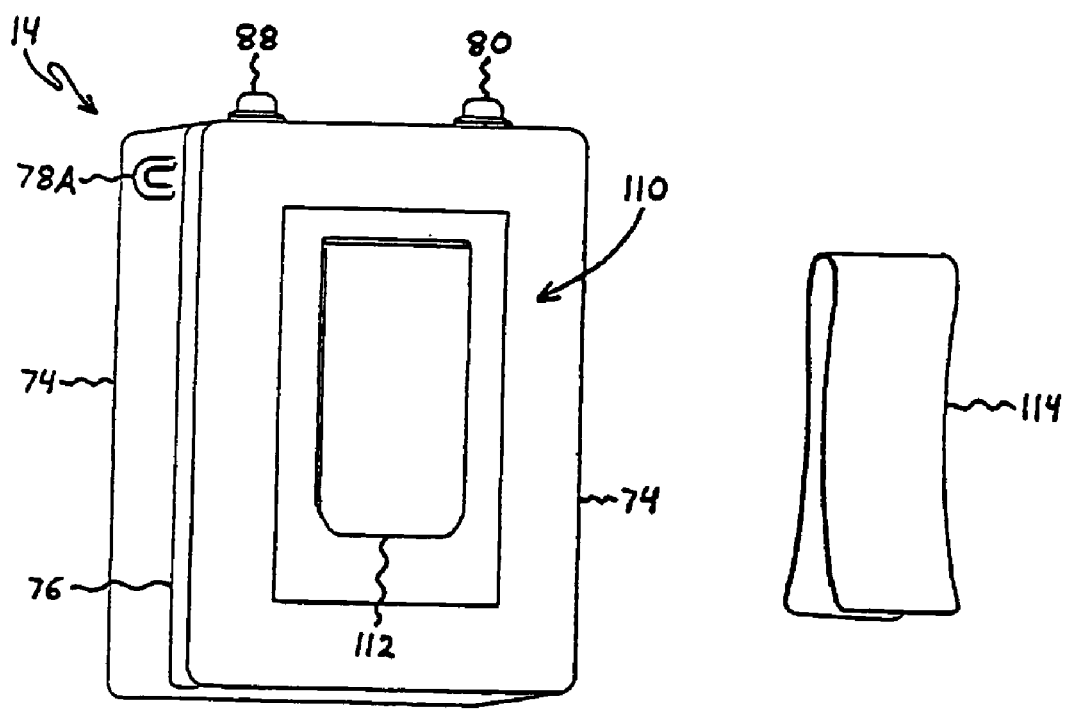
FIG. 5A is a rear perspective view of the portable unit in FIGS. 3A and 3B, wherein the back of the portable unit is shown to include a lock pocket for receiving a clipping member.
FIG. 5B is a perspective view of a resilient clipping member.

FIG. 5A is a rear perspective view of the portable unit 14 in FIGS. 3A and 3B. As shown in FIG. 5A, the back of the portable unit 14 preferably includes a lock pocket 112 for closely receiving a clip or clipping member. The lock pocket 112 itself is affixed to, or integral with, the back portion of the casing 74.

FIG. 5B is a perspective view of a clipping member 114. As shown in FIG. 5B, the clipping member 114 is particularly shaped such that it can be closely received and selectively secured within the lock pocket 112 highlighted in FIG. 5A. Although other constituent materials may indeed be utilized, the clipping member 114 itself may be made of metal or plastic and is preferably resilient in nature.

Figure 5C:
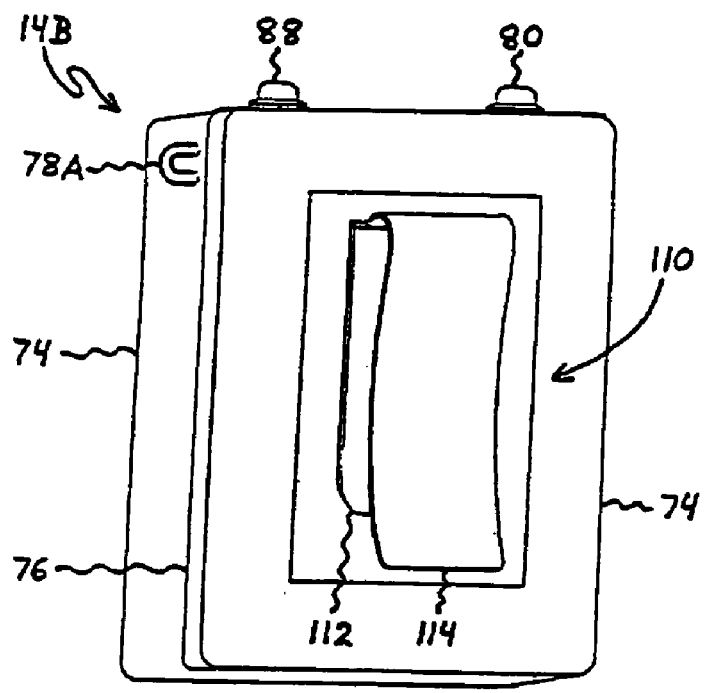
FIG. 5C is a rear perspective view of the portable unit in FIGS. 3A and 3B, wherein the clipping member of FIG. 5B is secured within the lock pocket highlighted in FIG. 5A.

FIG. 5C is a rear perspective view of the portable unit 14 in FIGS. 3A and 3B. As shown in FIG. 5C, the clipping member 114 of FIG. 5B is secured within the lock pocket 112 highlighted in FIG. 5A. When secured in this manner, the lock pocket 112 and the clipping member 114 thereby cooperatively actualize a clipping system 110. Provided with such a clipping system 110, the portable unit 14B can therefore be worn on-person by means of the secured clipping member 114 instead of by means of a string.

Figure 6:
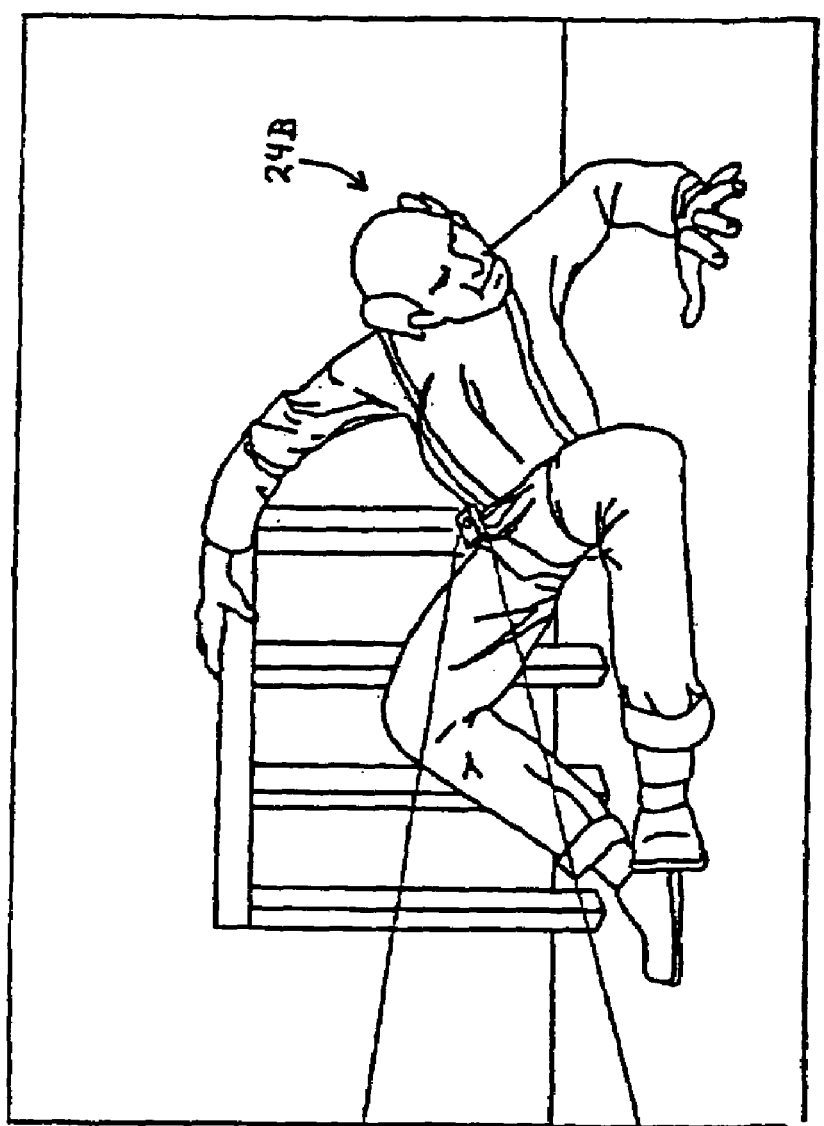
FIG. 6 is an illustration depicting how the portable unit of FIG. 5C can be clipped and worn on a person's article of clothing.
Figure 6:
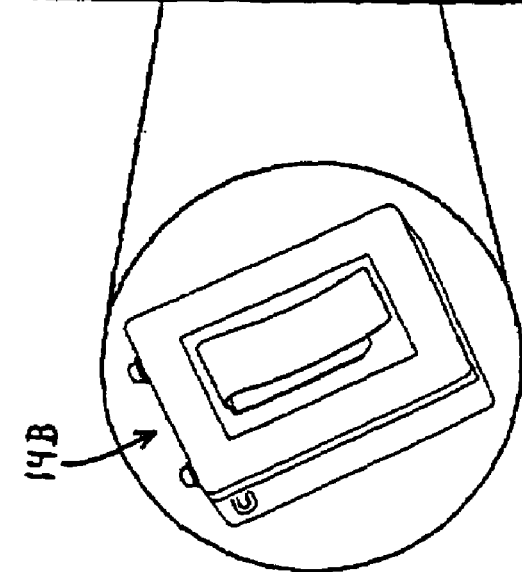

FIG. 6 is an illustration depicting how the portable unit 14B of FIG. 5C can be clipped onto an article of clothing worn by a person 24B. In this particular scenario, the portable unit 14B is clipped onto a pants waist seam or a belt worn by the person 24B. In other possible scenarios, however, the portable unit 14B may instead be clipped, for example, onto a shirt pocket, a pants pocket, or even suspenders (i.e., braces).

In addition to the string-and-ringlets contrivance depicted in FIG. 1 and the clipping system contrivance depicted in FIG. 6, it is to be understood that other mechanical contrivances may alternatively or additionally be included on the portable unit 14 so that the unit 14 can be easily toted on-person. Such other mechanical contrivances may include, for example, an armlet, a band, a belt, a bracelet, a clasp, a chain, a hook, a loop, a necklace, a pin, a ring, a strap, or the like, or even various combinations thereof.

During operation, when an outside caller attempts to call the person 24A on the telephone 16 in FIG. 1, a ring generator situated within the central office of a local telephone company transmits a pulsed ringing signal along the telephone line 18 to the telephone 16. Once the ringing signal is received and detected by the telephone 16, a ringer within the telephone 16 then audibly sounds off so that the person 24A hears the telephone 16 ringing. At generally the same time, the ring detector circuit 38 within the stationary unit 12 of the remote telephone answering system 10 detects the same ringing signal and "awakens" the system 10. In awakening the system 10, many to all of the numerous features and components included within both the stationary unit 12 and the portable unit 14 are thereby electrically enabled to perform their respective operations.

Assuming a conventional North American telephone network, for example, the central office of the local telephone company will transmit caller ID data signals along the telephone line 18 in between the first and second pulses of the ringing signal. Upon receiving these caller ID data signals, the caller ID processor 44 within the stationary unit 12 then promptly processes the caller ID data signals and therefrom generates caller identification information. After generating the caller identification information, the caller ID processor 44 then communicates the caller identification information in the form of data signals to the display logic 106 in the portable unit 14 via radio frequency electromagnetic waves transmitted from the antenna 32 of the stationary unit 12 to the antenna 98 of the portable unit 14A. Upon receiving the data signals, the display logic 106 then further processes the data signals such that caller identification information is ultimately displayed on the caller ID display 86 in a readable format. In this way, when the person 24A views the caller ID display 86 on the portable unit 14 as prompted to do so upon hearing the ringing of the telephone 16, the person 24A is thereby generally informed as to the identification of the outside caller.

If the person 24A desires to speak with the identified outside caller but is situated far enough away from the telephone 16 such that he anticipates that he will not be able to reach the telephone 16 before the caller hangs up, the person 24A may simply press the answer push-button 80 on the portable unit 14 to thereby answer the telephone 16. In pressing the answer push-button 80 on the portable unit 14, the switching circuit 36 within the stationary unit 36 is then activated via one or more control signals within the system 10 to promptly seize the telephone line 18 and thereby create an off-hook condition in the line 18. In creating the off-hook condition in the telephone line 18 in response to the outside call, the central office of the local telephone company then "completes" the call so that the line 18 is open for the exchange of verbal communication between the outside caller and the person 24A. Once the telephone line 18 is opened in this manner, the person 24A may then speak into the microphone 82 of the portable unit 14 in order to speak with the outside caller. By way of the speaker 84 in the portable unit 14, the outside caller, in turn, may speak back and be heard by the person 24A. In this way, therefore, the remotely situated person 24A is able to use the remote telephone answering system 10 to timely field a telephone call from an outside caller without having to miss the call. Equipped with such remote answering capability, the remote telephone answering system 10 is therefore quite ideal for use by a person who is, for example, elderly, infirm, disabled, handicapped, or not fully ambulatory.

Ideally, if the person 24A were content to do so, he could opt to carry on his conversation with the outside caller by simply using the remote telephone answering system 10 without having to actually reach and switch over to using the telephone 16 to finish the conversation. As a practical matter, however, since the battery 94 within the portable unit 14 is a limited power source and can therefore only supply electrical operating power to the portable unit 14 for some time before becoming fully discharged, the remote telephone answering system 10 is best utilized for brief telephone call conversations. For longer telephone conversations, the remote telephone answering system 10 is best utilized by the person 24A to initially answer the telephone 16 in order to buy time before ultimately reaching the telephone 16. Upon reaching the telephone 16, the person 24A may then take the receiver of the telephone 16 off-hook so as to maintain the off-hook condition in the telephone line 18. Thereafter, the person 24A may then press the answer push-button 80 on the portable unit 14 again in order to turn off the remote phone answering system 10 and thereby put the system 10 back to "sleep." By quickly switching over to the telephone 16 for the remainder of the conversation in this manner, the electrical power of the battery 94 in the portable unit 14 is thereby conserved.

In the event that the person 24A perceives that an emergency situation has arisen in between telephone calls, the person 24A may simply press the emergency (or "911") push-button 88 on the portable unit 14 a predetermined number of times (for example, at least 3 times) within a predetermined period of time (for example, in up to 10 seconds). If the emergency push-button 88 is pressed both frequently and timely enough as determined by the counter-timer circuit 108, the switching circuit 36 in the stationary unit 12 is then prompted to immediately seize the telephone line 18. Immediately thereafter, the autodialer circuit 46, in turn, is prompted to automatically speed dial an emergency response telephone number that had previously been programmed and stored in the random access memory (RAM) 48. Once the speed dialed call is "completed" by the central office, the person 24A may then converse with an emergency response worker via the microphone 82 and the speaker 84 on the portable unit 14 in order to get help and assistance. Equipped with such an emergency response capability, the remote telephone answering system 10 is therefore quite ideal for use by a person who is, for example, elderly, infirm, disabled, handicapped, or not fully ambulatory. In this way, such a person may easily call for assistance in emergency situations such as, for example, slip-and-fall incidents, strokes, heart episodes and attacks, diabetic shock, fires, burglaries, et cetera.

In addition to the particular embodiment of the remote telephone answering system disclosed and discussed hereinabove, it is to be understood that numerous other embodiments of the remote telephone answering system may alternatively be implemented pursuant to the present invention as well. For example, in simpler and more basic embodiments, the portable unit speaker, the caller ID display capability, and/or the emergency autodialing capability may optionally be omitted altogether from the system. On the other hand, for example, in more complex and sophisticated embodiments, an audible ringer for providing system ringing capability may additionally be incorporated within the portable unit.

While the present invention has been largely described in what is presently considered to be its most practical and preferred embodiment or implementation, it is to be understood that the invention is not to be limited to the preferred embodiment as disclosed hereinabove. On the contrary, the present invention is intended to cover various modifications and equivalent arrangements included within the spirit and scope of the claims appended hereinbelow, which scope is to be accorded the broadest interpretation so as to encompass all such modifications and equivalent structures as is permitted under the law.

What is claimed is:

1. A system for selectively answering a telephone, the system comprising:
 a stationary unit connectable in line with a telephone line extending to the telephone, wherein the stationary unit includes:
  a first antenna coupled to a first transmitter-receiver to communicate with a portable unit that includes a second antenna coupled to a second transmitter-receiver,
  a switching circuit to seize the telephone line after receiving a signal received from a first activatable switch of the portable unit, from a second activatable switch of the portable unit, or any combination thereof, and
  an autodialer circuit to dial a pre-programmed telephone number in response to a signal received from the second activatable switch of the portable unit;
 wherein the stationary unit receives verbal communications from the portable unit and transmits the verbal communications via the telephone line after the telephone line is seized; and
 wherein at least one of the stationary unit and the portable unit includes a counter-timer circuit to restrictively permit activation of the autodialer circuit when the second activatable switch is activated a number of times within a time period.

2. The system of claim 1, further comprising a ring detector circuit to activate the system upon detecting a ringing signal received over the telephone line.

3. The system of claim 2, further comprising an enclosure to house the ring detector circuit, the autodialer circuit, and the switching circuit.

4. The system of claim 2, wherein the ring detector circuit detects a ringing signal that has a voltage within a range of about 70 to 90 alternating-current volts and a frequency within a range of about 17 to 20 hertz.

5. The system of claim 1, wherein the stationary unit includes both an extendable power cord and a pronged plug affixed thereto for drawing electrical power from an alternating-current power outlet.

6. The system of claim 1, wherein the switching circuit includes at least one relay.

7. The system of claim 1, wherein at least one of the transmitter-receivers associated with the first and second antennae is a transceiver.

8. The system of claim 1, wherein the stationary unit includes a circuit for processing caller identification (caller ID) data signals received over the telephone line.

9. The system of claim 1, wherein the switching circuit seizes the telephone line by establishing an off-hook condition in response to a trigger from the first activatable switch or the second activatable switch.

10. The system of claim 1, wherein the stationary unit includes a speech network to process voice signals and to facilitate duplex operation of the stationary unit and the portable unit.

11. The system of claim 1, wherein the pre-programmed telephone number is an emergency response telephone number.

12. The system of claim 1, wherein the stationary unit includes an interactive user panel to selectively program a telephone number dialed by the autodialer circuit.

13. The system of claim 12, wherein the selectively programmed telephone number is stored in a memory of the stationary unit.

14. The system of claim 1, wherein the stationary unit includes a replaceable battery to supply power when a primary power source fails.

15. The system of claim 14, wherein:
the stationary unit includes a battery test circuit that includes a battery test button and a light source; and
wherein the light source illuminates in response to a manipulation of the battery test button, when the battery contains electrical charge sufficient to power the stationary unit.

16. A system for selectively answering a telephone, the system comprising:
a portable unit that includes:
a first antenna coupled to a first transmitter-receiver to communicate with a stationary, unit,
a first activatable switch to selectively trigger the stationary unit to seize a telephone line in response to a ringing signal received over the telephone line,
a second activatable switch to selectively trigger the stationary unit to seize the telephone line and to dial a pre-programmed telephone number, and
a microphone to transmit verbal communications to the stationary unit, such that the stationary unit is enabled to transmit the verbal communications via the telephone line after the telephone line is seized; and
wherein at least one of the stationary unit and the portable unit includes a counter-timer circuit to restrictively permit activation of the autodialer circuit when the second activatable switch is activated a number of times within a time period.

17. The system of claim 16, wherein the portable unit includes an armlet, a band, a belt, a bracelet, a clasp, a clip, a chain, a hook, a loop, a necklace, a pin, a ring, a string, a strap, or any combination thereof.

18. The system of claim 16, wherein the portable unit includes a speaker for receiving audible communications from a caller over.

19. The system of claim 16, wherein at least one of the first activatable switch and the second activatable switch is a push-button type switch.

20. The system of claim 16, wherein the portable unit includes a viewable display to visually present caller identification (caller ID) information generated from caller ID data signals received by the stationary unit.

* * * * *